United States Patent [19]
Suzuki et al.

[11] Patent Number: 6,020,408
[45] Date of Patent: Feb. 1, 2000

[54] COMPOSITION FOR PRESSURE-SENSITIVE ADHESIVE AND PRESSURE-SENSITIVE ADHESIVE SHEET USING PRESSURE-SENSITIVE ADHESIVE FORMED OF THE COMPOSITION

[75] Inventors: Takashi Suzuki, Urawa; Shunpei Watanabe, Yono, both of Japan

[73] Assignee: Lintec Corporation, Japan

[21] Appl. No.: 09/141,672

[22] Filed: Aug. 27, 1998

[30] Foreign Application Priority Data

Aug. 28, 1997 [JP] Japan ..................................... 9-247738
Jun. 2, 1998 [JP] Japan .................................... 10-169328

[51] Int. Cl.[7] ........................................................ C08K 5/54
[52] U.S. Cl. ........................... 524/265; 524/262; 524/267; 525/100; 525/102; 428/447
[58] Field of Search ................................... 524/262, 265, 524/267; 525/100, 102; 428/447

[56] References Cited

U.S. PATENT DOCUMENTS 5,032,636  7/1991  Ono et al. ................................ 524/265

*Primary Examiner*—Melvyn I. Marquis
*Attorney, Agent, or Firm*—Brinks Hofer Gilson & Lione; G. Peter Nichols

[57] ABSTRACT

A pressure-sensitive adhesive composition comprises, as pressure-sensitive adhesive components thereof, an acrylic-based polymer and a silane compound having at least two alkoxysilyl groups in its molecular. The silane compound is a compound which is represented by the following general formula (I).

[General Formula (I)]

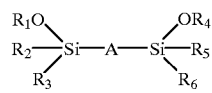

(In this general formula, "A" is a group having a chain structure and/or a ring structure containing 1 to 12 carbon atom(s), $R_1$ and $R_4$ are respectively an alkyl group containing 1 to 5 carbon atom(s), and $R_2$, $R_3$, $R_5$ and $R_6$ are respectively an alkyl group or alkoxyl group containing 1 to 5 carbon atom(s).)

The amount of the silane compound to be contained is preferably 0.001 to 10 parts by weight with respect to the pressure-sensitive adhesive composition of 100 parts by weight. Thus formed pressure-sensitive adhesive composition can sufficiently and effectively relieve a stress concentration which is caused by shrinkage of the base material under the high temperature and high moisture condition.

48 Claims, 1 Drawing Sheet

COMPOSITION FOR PRESSURE-SENSITIVE ADHESIVE AND PRESSURE-SENSITIVE ADHESIVE SHEET USING PRESSURE-SENSITIVE ADHESIVE FORMED OF THE COMPOSITION

BACKGROUND OF THE INVENTION

1. Field of the Invention

This invention relates to a composition for a pressure-sensitive adhesive (hereinafter, referred to as pressure-sensitive adhesive composition) and a pressure sensitive adhesive sheet using the pressure-sensitive adhesive composition, and in particular relates to a pressure-sensitive adhesive composition which is suitably used for sticking optical films such as light-polarizing sheets and phase difference sheets and the like which are to be stuck onto optical parts such as a liquid crystal cell of a liquid crystal display device or for sticking shading films onto window glass, and a pressure-sensitive adhesive sheet using the pressure-sensitive adhesive composition.

2. Description of the Background Art

In optical parts such as a liquid crystal cell of a liquid crystal display device, a light-polarizing sheet is stuck thereto. In general, such a light-polarizing sheet has a three-layer structure including a polarizing element which is formed of a PVA(polyvinylalcohol)-based material and protective films which are attached to the opposite surfaces of the light-polarizing element and formed of TAC (triacetylcellulose)-based material, in which a release liner is attached onto at least one of the protective films by means of a pressure-sensitive adhesive layer.

When such a light-polarizing sheet is attached to the liquid crystal display device, it is stuck onto the liquid crystal cell through the pressure-sensitive adhesive layer after the release liner has been peeled off.

Such a light-polarizing sheet has poor dimensional stability due to its material properties. In particular, the light-polarizing sheet is subject to large dimensional changes due to expansion and contraction when it is put under heat or wet heat condition, with this result curl or the like being likely to be produced.

As for the pressure-sensitive adhesive (that is the pressure-sensitive adhesive composition), there is used a pressure-sensitive adhesive composition which is formed by adding a coupling agent of silane which contains epoxy-silane or the like as its main component and has one alkoxysilyl group in its molecular into a two-liquid curable type hardening resin composition which has high adhesive strength and high shearing modulus.

The use of such a silane coupling agent increases the cohesive strength of the pressure-sensitive adhesive. With this result, the pressure-sensitive adhesive layer formed of such a pressure-sensitive adhesive can not sufficiently absorb or relieve the stress which is resulted from the dimensional changes in the light-polarizing sheet caused under the heat or wet heat condition.

When such unfavorable situation would occur, the distribution of the residual stress exerted in the light-polarizing sheet becomes ununiform so that stress concentration occurs in particular at the peripheral portion thereof. As a result, displacement of the light-polarizing sheet occurs, which results in a problem in that a white appearance is likely to be produced in a TN (TFT) liquid crystal cell and a color unevenness is likely to be caused in a STN liquid crystal cell. Further, there is another problem in that lifting and peeling off of the light-polarizing sheet from the liquid crystal cell are also likely to be caused.

Further, under the wet heat condition, such lifting and peeling off of the light-polarizing sheet from the liquid crystal cell is more likely to be caused since water enters into the boundary face between the pressure-sensitive adhesive layer and the glass substrate. Therefore, it is required to prevent occurrence of such defects beforehand.

SUMMARY OF THE INVENTION

Accordingly, it is an object of the present invention to provide a composition for pressure-sensitive adhesive which can relieve a stress concentration which is caused by contraction of the base material under high temperature and high moisture condition.

In order to achieve the object mentioned above, the present invention is directed to a pressure-sensitive adhesive composition which comprises, as pressure-sensitive adhesive components thereof, an acrylic-based polymer; and a silane compound having at least two alkoxysilyl groups in its molecular.

In the present invention, the silane compound can be formed from a compound which is represented by the following general formula (I).

[General Formula (I)]

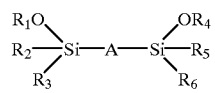

(In this general formula, "A" is a group having a chain structure and/or a ring structure containing 1 to 12 carbon atom(s), $R_1$ and $R_4$ are respectively an alkyl group containing 1 to 5 carbon atom(s), and $R_2$, $R_3$, $R_5$ and $R_6$ are respectively an alkyl group or alkoxyl group containing 1 to 5 carbon atom(s).)

Further, the silane compound can be formed from a compound which is represented by the following general formula (II).

[General Formula (II)]

(In this general formula, "m" is an integer of any one of 1 to 12, and $R_7$ and $R_8$ are respectively an alkyl group containing 1 to 5 carbon atom(s).)

Furthermore, the silane compound can be also formed from a compound which is represented by the following general formula (III).

[General Formula (III)]

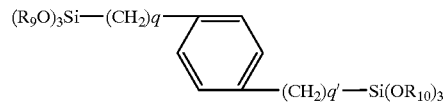

(In this general formula, q and q' are respectively an integer of any one of 0 to 6 and satisfy the relationship of q+q'≦6, and $R_9$ and $R_{10}$ are respectively an alkyl group containing 1 to 5 carbon atom(s), respectively.)

Furthermore, the silane compound can be also formed from a compound which is represented by the following general formula (IV).

[General Formula (IV)]

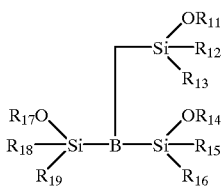

(In this general formula, "B" is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s))

Moreover, the silane compound can be also formed from a compound which is represented by the following general formula (V).

[General Formula (V)]

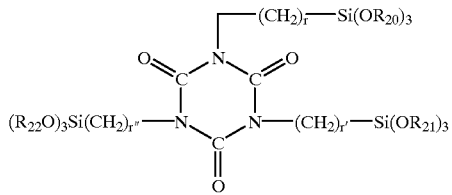

(In this general formula, r, r' and r" are respectively an integer of any one of 0 to 6 and satisfy the relationship of $r+r'+r'' \leq 9$, and $R_{20}$, $R_{21}$ and $R_{22}$ are respectively an alkyl group containing 1 to 5 carbon atom(s).)

In the pressure-sensitive adhesive compositions mentioned above, it is preferred that a ratio of the silane compound to be added is 0.001 to 10 parts by weight with respect to the pressure-sensitive adhesive composition of 100 parts by weight.

Further, it is also preferred that the pressure-sensitive adhesive composition is used for sticking an optical function film onto an adherend.

The present invention is also directed to a pressure-sensitive adhesive sheet having a pressure-sensitive adhesive layer formed of a pressure-sensitive adhesive composition, in which the pressure-sensitive adhesive composition comprises, as pressure-sensitive adhesive components thereof, an acrylic-based polymer; and
   a silane compound having at least two alkoxysilyl groups in its molecular.

In this pressure-sensitive adhesive sheet, the pressure-sensitive adhesive composition can be formed from the compositions mentioned above.

Other objects, functions and effects of the present invention will be apparent when the following description of the invention and the description of the examples are considered in conjunction with the attached drawing.

DETAILED DESCRIPTION OF THE PREFERRED EMBODIMENTS

Figure 1:
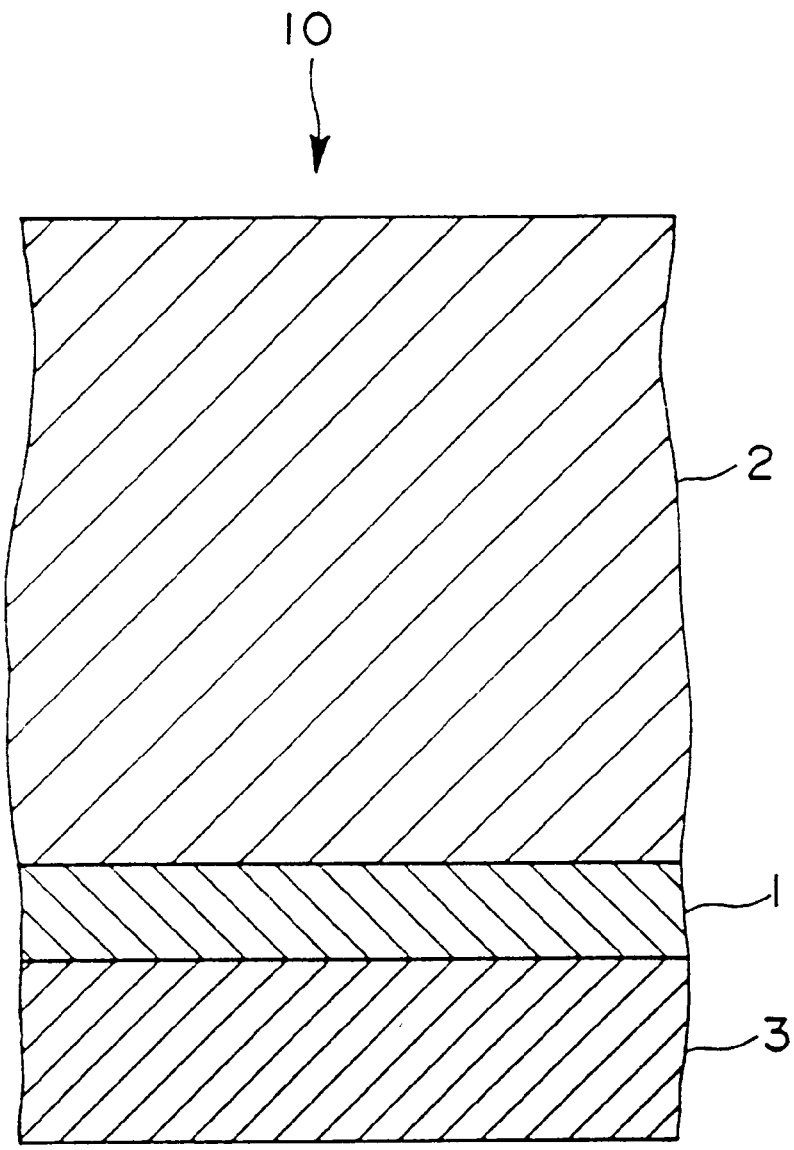
FIG. 1 is a sectional view of a pressure-sensitive adhesive sheet (a polarizing sheet with an pressure-sensitive adhesive layer) produced using the pressure-sensitive adhesive composition according to the present invention.

A pressure-sensitive adhesive composition according to the present invention comprises, as pressure-sensitive adhesive components thereof, an acrylic-based polymer and a silane compound including at least two alkoxysilyl groups in its molecular.

Hereinafter, the pressure-sensitive adhesive composition according to the present invention will be described in more detail.

In the pressure-sensitive adhesive composition of the present invention, acrylic-based polymer is used as one of pressure-sensitive adhesive components. By containing such an acrylic-based polymer, weather resistant property, flexibility and heat resistant property of the pressure-sensitive adhesive can be maintained to an excellent level.

The acrylic-based polymer is mainly composed of a polymer or copolymer which contains main monomer component and a functional group containing monomer component for improving crosslinking property and adhesive property.

Examples of the main monomer component include alkyl esters of acrylic acid such as ethyl acrylate, butyl acrylate, amyl acrylate, 2-ethylhexyl acrylate, octyl acrylate, cyclohexyl acrylate and benzyl acrylate and the like; and alkyl esters of methacrylic acid such as butyl methacrylate, 2-ethylhexyl methacrylate, cyclohexyl methacrylate and benzyl methacrylate and the like.

Examples of the functional group containing monomer component include monomer containing carboxyl group such as acrylic acid, methacrylic acid, maleic acid, itaconic acid and the like; monomer containing hydroxyl group such as 2-hydroxyethyl (meth)acrylate, 2-hydroxypropyl (meth) acrylate, N-methylolacrylamide and the like; acrylamide; methacrylamide; grycydyl methacrylate; and the like.

Further, examples of the other components which can be contained in the acrylic-based polymer include methyl acrylate, methyl methacrylate, ethyl methacrylate, vinyl acetate, styrene, acrylonitrile and the like. In this case, they may be used in combination with the main monomer component and the functional group containing monomer component.

The reasons why the materials mentioned above are used for the components of the acrylic-based polymer are as follows. First, since these polymers or copolymers (acrylic-based polymers) mentioned above do not have unsaturated bonding in their moleculars, the stability of the pressure-sensitive adhesive composition against light and oxygen can be improved. Further, it is possible to obtain a pressure-sensitive adhesive composition having qualities and properties that are suitable for a particular application by selecting types of monomer and their molecular weights appropriately.

The weight-average molecular weight of the acrylic-based polymer is preferably about 600,000 to 2,000,000, and more preferably about 1,000,000 to 1,800,000, and most preferably about 1,200,000 to 1,600,000. Use of the acrylic-based polymer having the molecular weight within the above-mentioned ranges enables to obtain a pressure-sensitive adhesive having appropriate durability and adhesive strength with respect to a base material.

The pressure-sensitive adhesive component containing such an acrylic-based polymer as its main component can be used in the forms of both crosslinking and non-crosslinking types, but the crosslinking type is more preferable. In the case of a crosslinking type, a crosslinking agent can be added, if required. Examples of the crosslinking agent include epoxy-based compound, isocyanate-based compound, metal chelate compound, metal alkoxide, metal salt, amine compound, hydrazine compound, aldehyde-based compound and the like.

Further, a plasticizer may be added into the pressure-sensitive adhesive component. Examples of the plasticizer include esters such as phthalic acid ester, trimellitic acid ester, pyromellitic acid ester, adipic acid ester, sebacic acid ester, phosphate triester, glycol ester and the like; process oil; liquid polyether; liquid polyterpene; other liquid resins; and the like. In this case, they may be used alone or in combination of two or more thereof.

The pressure-sensitive adhesive composition according to the present invention comprises a silane compound including at least two alkoxysilyl groups in its molecular. Since such a pressure-sensitive adhesive composition has flexibility with maintaining adhesive strength to the base material, weather resistant property and durability, it is possible to absorb and relieve the contraction stress caused in the base material under the wet and heat condition.

In the present invention, there is no particular limitation on the silane compound which includes at least two alkoxysilyl groups in its molecular. However, it is preferable to use a silane compound including two alkoxysilyl groups which is represented by the following general formula (I), and it is more preferable to use a silane compound which is represented by the general formula (II) or (III). By adding such a silane compound, it is possible to obtain a pressure-sensitive adhesive composition which can absorb and relieve the contraction stress caused in the base material under the wet and heat condition sufficiently and more effectively.

[General Formula (I)]

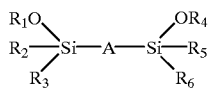

(In this general formula, "A" is a group having a chain structure and/or a ring structure containing 1 to 12 carbon atom(s), $R_1$ and $R_4$ are respectively an alkyl group containing 1 to 5 carbon atom(s), and $R_2$, $R_3$ $R_5$ and $R_6$ are respectively an alkyl group or alkoxyl group containing 1 to 5 carbon atom(s).)

Examples of the silane compound which can be represented by the general formula (I) include bis(dimethoxyethylsilyl)hexane, bis(diethoxyethylsilyl)hexane, bis[3-(triethoxysilyl)propyl]tetrasulfid, bis[3-(trimethoxysilyl)propyl]tetrasulfid, bis[3-(trimethoxysilyl)propyl]urea, bis[3-(triethoxysilyl)propyl]urea, bis(trimethoxysilyl)ethylene, bis(triethoxysilyl)ethylene, bis(trimethoxysilyl)-1,7-octadiene, bis(triethoxysilyl)-1,7-octadiene, bis(trimethoxysilylpropyl)amine, bis(triethoxysilylpropyl)amine, bis[3-(trimethoxysilyl)propyl]ethylenediamine, bis[3-(triethoxysilyl)propyl]ethylenediamine and the like. In this case, they may be used alone or in combination of two or more thereof.

[General Formula (II)]

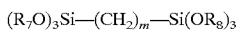

(In this general formula, "m" is an integer of any one of 1 to 12, and $R_7$ and $R_8$ are respectively an alkyl group containing 1 to 5 carbon atom(s).)

Examples of the silane compound which can be represented by the general formula (II) include bis(trimethoxysilyl)methane, bis(trimethoxysilyl)ethane, bis(trimethoxysilyl)hexane, bis(trimethoxysilyl)octane, bis(triethoxysilyl)methane, bis(triethoxysilyl)ethane, bis(triethoxysilyl)hexane, bis(triethoxysilyl)octane and the like. In this case, they may be used alone or in combination of two or more thereof.

[General Formula (III)]

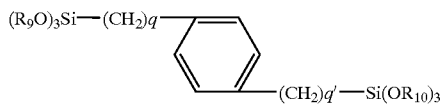

(In this general formula, q and q' are respectively an integer of any one of 0 to 6 and satisfy the relationship of q+q'≦6, and $R_9$ and $R_{10}$ are respectively an alkyl group containing 1 to 5 carbon atom(s), respectively.)

Examples of the silane compound which can be represented by the general formula (III) include 1,4-bis(trimethoxysilylethyl)benzene, 1,4-bis(triethoxysilylethyl)benzene and the like. In this case, they may be used alone or in combination of two or more thereof.

Further, it is preferred that the silane compound contains three alkoxysilyl groups in its molecular. A pressure-sensitive adhesive composition to which such a silane compound is added makes it posible to absorb and relieve the shrinkage stress caused in the base material under the wet and heat condition sufficiently and more effectively in the same manner as the pressure-sensitive adhesive composition described above.

As for an example of the silane compound containing three alkoxysilyl groups in its molecular, it is possible to mention a silane compound which is represented by the following general formula (IV).

[General Formula (IV)]

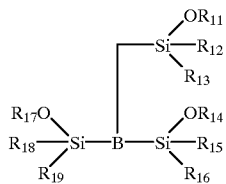

(In this general formula, "B" is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s))

As for the exemplary example of the silane compound which can be represented by the general formula (IV), it is possible to mention a silane compound of isocyanuric acid ester which is represented by the following general formula (V), and the like.

[General Formula (V)]

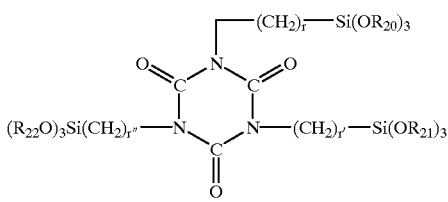

(In this general formula, r, r' and r" are respectively an integer of any one of 0 to 6 and satisfy the relationship of r+r'+r"≦9, and $R_{20}$, $R_{21}$ and $R_{22}$ are respectively an alkyl group containing 1 to 5 carbon atom(s).)

Examples of the silane compound which can be represented by the general formula (V) include tris(3- trimethoxysilyl propyl)isocyanurate, tris(3-triethoxysilyl propyl)isocyanurate and the like. In this case, they may be used alone or in combination of two or more thereof.

As for silane compounds which can be used in the present invention, it is preferred that they have good compatibility with the pressure-sensitive adhesive component and have a property that can transmit light. In this connection, for example, materials which are substantially transparent are preferably used for the silane compound having the property that can transmit light.

The amount of such a silane compound to be added is preferably about 0.001 to 10 parts by weight with respect to 100 parts by weight of the pressure-sensitive adhesive composition, and more preferably about 0.005 to 5 parts by weight. If the amount of the silane compound to be added is too small, the adhesive strength of the pressure-sensitive adhesive with respect to a glass under the wet and heat condition becomes insufficient, so that lifting and peeling off of the light-polarizing film from the liquid crystal cell become likely to occur. On the other hand, if the amount of the silane compound to be added is too much, it is not possible to obtain an improved effect that is achieved by the addition of the silane compound.

In addition to the silane compound, various additives may be added into the pressure-sensitive adhesive composition, as required. Examples of such various additives include ultraviolet absorbers, fillers, anti-statick additives, adhesivity adjusting agents, anti-ageing agents, tackifiers, pigments, dyestuffs and the like.

It is preferred that the pressure-sensitive adhesive composition of the present invention is used for sticking an optical functional film onto an adherend. When the pressure-sensitive adhesive composition is used for this purpose, it is possible to stick the optical functional film to the adherend without giving any adverse effects to the optical properties of the film to manufacture an optical element. In this connection, it is to be noted that "optical functional film" means film-shaped optical parts having various optical functions. Examples of such film-shaped optical parts include light polarizing sheets (polarizers), analizers, phase difference sheets (phase sifters of ¼ wavelength or ½ wavelength), and light-rotating elements (Faraday elements, spontaneous light-rotating elements), and the like. Further, as for an example of the light polarizing sheet, it is possible to mention a light polarizing sheet having a generally used layered structure, which has a polarizing element formed of a PVA(polyvinylalcohol)-based material and protective films which is formed of a TAC(triacetylcellulose)-based material and attached to the opposite surfaces of the polarizing element so as to sandwich it therebetween.

When the pressure-sensitive adhesive composition is used for sticking an optical functional film onto an adherend, it is preferred that the thickness of the pressure-sensitive adhesive layer (dry film thickness) formed from the pressure-sensitive adhesive composition of the present invention is about 5 to 100 µm, and more preferably about 10 to 60 µm.

On the other hand, there is no particular limitation on the adherend (optical parts) to which the light-polarizing sheet is to be stuck with the pressure-sensitive adhesive layer. Examples of the adherend include organic glass, inorganic glass and glass formed from composite materials. In these adherends, the organic glass and inorganic glass are particularly preferred. Of course, the adherend may be formed from a material other than these glasses mentioned above.

Examples of a pressure-sensitive adhesive sheet of the present invention include a sheet which is provided with a pressure-sensitive adhesive layer formed on a base material. In this connection, such a pressure-sensitive adhesive layer is composed of the above-mentioned pressure-sensitive adhesive composition. Further, a release liner may be attached onto the pressure-sensitive adhesive layer for improving handling thereof.

There is no particular limitation on materials and properties for the base material and the release liner. Any types of base materials and release liner can be used in the pressure-sensitive adhesive sheet.

Examples of the base material include poly(vinyl alcohol)-based film; polyene-based film; polyester-based film; polyolefine-based film such as polyethylene film and the like; poly(vinyl chloride) film; polyurethane film; polyamide film; polyimide film; polycarbonate film; and the like.

Examples of the release liner include a film in which a polyester film is used as a base and a releasable type coating layer (silicone layer) is formed on a sticking surface of the base which is to be attached to the pressure-sensitive adhesive layer, and other films.

Examples of the method of forming the pressure-sensitive adhesive layer of the pressure-sensitive adhesive sheet of the present invention include a directly applying method or a transfer applying method using a die-coater, a blade-coater, a roll-coater and the like. In this case, an organic solvent-based coating fluid, an emulsion-based coating fluid or a water-soluble coating fluid may be used as a coating fluid for the pressure-sensitive adhesive composition.

The pressure-sensitive adhesive sheet according to the present invention can be applied to optical functional films which can be stuck onto optical parts such as a light-polarizing sheet provided with a pressure-sensitive adhesive layer, various pressure-sensitive adhesive tapes, pressure-sensitive adhesive films, pressure-sensitive adhesive labels, masking tapes, surface protective films, shading films, films for prevention of reflection of light, and the like.

EXAMPLES

Hereinafter, the pressure-sensitive adhesive composition according to the present invention will be explained with reference to the actual examples.

Example 1

1. Preparation of Pressure-sensitive Adhesive Composition

Compositions mentioned in the following ① to ③ were mixed to prepare a pressure-sensitive adhesive composition.

① Component of Pressure-sensitive Adhesive Composition

Pressure-sensitive adhesive composition is formed from an acrylic-based polymer of 100 parts by weight. The acrylic-based polymer is composed of: butyl acrylate of 97 parts by weight with respect to the acrylic-based polymer of 100 parts by weight; acrylic acid of 2.9 parts by weight with respect to the acrylic-based polymer of 100 parts by weight; and 2-hydroxy ethylacrylate of 0.1 parts by weight with respect to acrylic-based polymer of 100 parts by weight.

Weight-average molecular weight of acrylic-based polymer is 1,200,000.

② Component of Cross-linking Agent

Cross-linking agent is composed of trimethylol propane tolylene diisocyanate of 0.1 parts by weight with respect to the acrylic-based polymer of 100 parts by weight.

③ Component of Silane Compound

Silane compound is composed of bis(trimethoxysilyl) ethane of 0.1 parts by weight with respect to the acrylic-based polymer of 100 parts by weight.

2. Manufacture of Light-polarizing Sheet Provided with Pressure-sensitive Adhesive Layer Toluene was added to the prepared pressure-sensitive adhesive composition, and this pressure-sensitive adhesive composition was applied onto a release liner 3 described below using a blade-coater and then it was dried to form a pressure-sensitive adhesive layer 1 on one surface of a light-polarizing sheet 2 by a transfer applying method. Thereafter, it was being aged at a normal temperature for one week, and thereby a light-polarizing sheet 10 having a pressure-sensitive adhesive layer as shown in FIG. 1 was manufactured. The thickness of the pressure-sensitive adhesive layer after being dried was 25 μm.

[1] Light-polarizing Sheet

Structure of light-polarizing sheet: Triple layer laminate composed of triacetylcellulose film, polyvinyl alcohol film and triacetylcellulose film.

Thickness of light-polarizing sheet: 180 μm

[2] Release Liner

Constituent material: Polyester film (silicone treatment was applied on one side thereof)

("SP PET38", manufactured by LINTEC Corporation)

Thickness: 38 μm

Example 2

A pressure-sensitive adhesive composition was prepared in the same way as in Example 1 except that a ratio of silane compound to be added was changed to 5 parts by weight from 0.1 parts by weight, and then a light-polarizing sheet 10 having a pressure-sensitive adhesive layer was manufactured using the prepared pressure-sensitive adhesive composition.

Example 3

A pressure-sensitive adhesive composition was prepared in the same way as in Example 1 except that a component to be added as the silane compound was changed to bis(triethoxysilyl)octane of 0.15 parts by weight, and then a light-polarizing sheet 10 having a pressure-sensitive adhesive layer was manufactured by using the prepared pressure-sensitive adhesive composition.

Example 4

A pressure-sensitive adhesive composition was prepared in the same way as in Example 1 except that a component to be added as the silane compound was changed to 1,4-bis(triethoxysilylethyl)benzene of 0.14 parts by weight, and then a light-polarizing sheet 10 having a pressure-sensitive adhesive layer was manufactured by using the prepared pressure-sensitive adhesive composition.

Example 5

A pressure-sensitive adhesive composition was prepared in the same way as in Example 1 except that a component to be added as the silane compound was changed to bis(diethoxyethylsilyl)hexane of 0.15 parts by weight, and then a light-polarizing sheet 10 having a pressure-sensitive adhesive layer was manufactured by using the prepared pressure-sensitive adhesive composition.

Example 6

A pressure-sensitive adhesive composition was prepared in the same way as in Example 1 except that weight-average molecular weight of the acrylic-based polymer used as the pressure-sensitive adhesive component was changed to 1,600,000 from 1,200,000, and then a light-polarizing sheet 10 having a pressure-sensitive adhesive layer was manufactured by using the prepared pressure-sensitive adhesive composition.

Example 7

A pressure-sensitive adhesive composition was prepared in the same way as in Example 3 except that weight-average molecular weight of acrylic-based polymer was changed to 1,600,000 from 1,200,000, and then a light-polarizing sheet 10 having a pressure-sensitive adhesive layer was manufactured by using the prepared pressure-sensitive adhesive composition.

Example 8

A pressure-sensitive adhesive composition was prepared in the same way as in Example 4 except that weight-average molecular weight of acrylic-based polymer was changed to 1,600,000 from 1,200,000, and then a light-polarizing sheet 10 having a pressure-sensitive adhesive layer was manufactured by using the prepared pressure-sensitive adhesive composition.

Example 9

A pressure-sensitive adhesive composition was prepared in the same way as in Example 5 except that weight-average molecular weight of acrylic-based polymer was changed to 1,600,000 from 1,200,000, and then a light-polarizing sheet 10 having a pressure-sensitive adhesive layer was manufactured by using the prepared pressure-sensitive adhesive composition.

Example 10

A pressure-sensitive adhesive composition was prepared in the same way as in Example 1 except that the component of the acrylic-based polymer was changed to butyl acrylate of 97 parts byweight and 2-hydroxy ethylacrylate of 3 parts byweight, and then a light-polarizing sheet 10 having a pressure-sensitive adhesive layer was manufactured by using the prepared pressure-sensitive adhesive composition.

Example 11

A pressure-sensitive adhesive composition was prepared in the same way as in Example 10 except that the compound to be added as the silane compound was changed to bis(triethoxysilyl)hexane of 0.15 parts by weight, and then a light-polarizing sheet 10 having a pressure-sensitive adhesive layer was manufactured by using the prepared pressure-sensitive adhesive composition.

Example 12

A pressure-sensitive adhesive composition was prepared in the same way as in Example 10 except that the compound to be added as the silane compound was changed to 1,4-bis(trimethoxysilylethyl)benzene of 0.14 parts by weight, and then a light-polarizing sheet 10 having a pressure-sensitive adhesive layer was manufactured by using the prepared pressure-sensitive adhesive composition.

Example 13

A pressure-sensitive adhesive composition was prepared in the same way as in Example 10 except that the compound to be added as the silane compound was changed to bis(trimethoxysilylpropyl)amine of 0.13 parts by weight, and then a light-polarizing sheet 10 having a pressure-sensitive adhesive layer was manufactured by using the prepared pressure-sensitive adhesive composition.

Example 14

A pressure-sensitive adhesive composition was prepared in the same way as in Example 10 except that the component to be added as the silane compound was changed to bis (diethoxyethylsilyl)hexane of 0.15 parts by weight, and then a light-polarizing sheet 10 having a pressure-sensitive adhesive layer was manufactured by using the prepared pressure-sensitive adhesive composition.

Example 15

A pressure-sensitive adhesive composition was prepared in the same way as in Example 1 except that the amount of the silane compound to be added was changed to 0.005 from 0.1 parts by weight, and then a light-polarizing sheet 10 having a pressure-sensitive adhesive layer was manufactured by using the prepared pressure-sensitive adhesive composition.

Example 16

A pressure-sensitive adhesive composition was prepared in the same way as in Example 1 except that the compound to be added as the silane compound was changed to tris(3-trimethoxysilyl propyl)isocyanurate of 0.1 parts by weight, and then a light-polarizing sheet 10 having a pressure-sensitive adhesive layer was manufactured by using the prepared pressure-sensitive adhesive composition.

Example 17

A pressure-sensitive adhesive composition was prepared in the same way as in Example 1 except that the compound to be added as the silane compound was changed to tris(3-triethoxysilyl propyl)isocyanurate of 5 parts by weight, and then a light-polarizing sheet 10 having a pressure-sensitive adhesive layer was manufactured by using the prepared pressure-sensitive adhesive composition.

Comparative Example 1

A pressure-sensitive adhesive composition was prepared in the same way as in Example 1 except that the silane compound was not added, and then a light-polarizing sheet 10 having a pressure-sensitive adhesive layer was manufactured by using the prepared pressure-sensitive adhesive composition.

Comparative Example 2

A pressure-sensitive adhesive composition was prepared in the same way as in Example 1 except that the silane compound was not added and that weight-average molecular weight of acrylic-based polymer was changed to 1,600,000 from 1,200,000, and then a light-polarizing sheet 10 having a pressure-sensitive adhesive layer was manufactured by using the prepared pressure-sensitive adhesive composition.

Comparative Example 3

A pressure-sensitive adhesive composition was prepared in the same way as in Example 1 except that the compound to be added as the silane compound including one alkoxysilyl group in its molecular was changed to γ-glycidoxypropyl trimethoxysilane of 0.1 parts by weight, and then a light-polarizing sheet 10 having a pressure-sensitive adhesive layer was manufactured by using the prepared pressure-sensitive adhesive composition.

Comparative Example 4

A pressure-sensitive adhesive composition was prepared in the same way as in Example 1 except that the component to be added as the silane compound was changed to γ-glycidoxypropyl trimethoxysilane of 5 parts by weight, and then a light-polarizing sheet 10 having a pressure-sensitive adhesive layer was manufactured by using the prepared pressure-sensitive adhesive composition.

Comparative Example 5

A pressure-sensitive adhesive composition was prepared in the same way as in Example 6 except that the compound to be added as the silane compound was changed to γ-glycidoxypropyl trimethoxysilane of 0.1 parts by weight, and then a light-polarizing sheet 10 having a pressure-sensitive adhesive layer was manufactured by using the prepared pressure-sensitive adhesive composition.

3. Evaluations of Characteristics of Pressure-sensitive Adhesive

The light-polarizing sheets having the pressure-sensitive adhesive layers which were manufactured using the respective pressure-sensitive adhesive compositions prepared by Examples 1 to 17 and the Comparative Examples 1 to 5, respectively, were stuck onto both sides of the glass plates for a liquid crystal cell ("H coating glass", manufactured by Nippon Sheet Glass Company) so as to form crossed Nicols. Then, these light-polarizing sheets were respectively subjected to two kinds of environmental conditions described below.

(1) 100° C. for 500 hours (2) 80° C. and relative humidity of 90% for 500 hours

Then, visual assessments were performed for the respective examples to observe whether there is a state that light is leaking through the light-polarizing sheet due to the residual stress.

The assessment standards for the state of the leakage of light are as follows.

○: The leakage of light is barely observed by eyes.

X: The leakage of light is pronouncedly observed by eyes.

The results are shown in the attached Table 1.

The light-polarizing sheets having the pressure-sensitive adhesive layers which were manufactured by using the respective pressure-sensitive adhesive compositions prepared by the Examples 1 to 17 and the Comparative Examples 1 to 5 were respectively stuck onto both sides of the glass plates for a liquid crystal cell ("H coating glass", manufactured by Nippon Sheet Glass Company) so as to form crossed Nicols. Then, these light-polarizing sheets were placed (1) in an environmental condition of 100° C. for 500 hours and (2) in an environmental condition of 80° C. and relative humidity of 90% for 500 hours, respectively, and then the occurrence of the lifting of light-polarizing sheet and the peeling off of the light polarizing sheets were observed by eyes, respectively.

The assessment standards for the lifting and peeling are as follows.

○: No lifting or peeling are observed.

X: A little lifting or peeling are observed.

X X: The polarizing sheet is almost peeled off.

The results of the assessments thereof are shown in the attached Table 2.

Further, the adhesive strengths of the respective light-polarizing sheets each having the pressure-sensitive adhesive composition described above were measured in accordance with JIS C 2107.

First, test pieces each having a shape of 25 mm×150 mm were formed from the respective light-polarizing sheets each having the respective pressure-sensitive adhesive layer. Next, these test pieces were respectively stuck onto the glass plates for a liquid crystal cell ("H coating glass", manufactured by Nippon Sheet Glass Company), and then these test pieces were respectively subjected to an autoclave processing for 20 minutes under 5 atmospheric pressure at 50° C. Thereafter, these test pieces were being left for 24 hours under the atmosphere at a temperature of 23° C. and a relative humidity of 65% RH. Then, in order to measure the respective adhesive strengths, each test piece stuck onto the glass plate was peeled in the horizontal direction in a turned back manner with respect to the surface of the glass plate at a speed of 300 mm/min, and a load at the time of peeling off each test piece from the glass plate was measured.

The results of the measurements of the adhesive strengths of the respective test pieces are shown in the attached Table 2.

From the results of the above-mentioned evaluations, it was confirmed that the pressure-sensitive adhesive compositions according to the present invention in the Examples 1 to 17 can suppress effectively occurrence of lifting and peeling off of the light-polarizing sheets, even if the pressure-sensitive adhesive compositions were being placed under the wet and dry condition.

Further, even if the amount of the silane compound to be added to the respective pressure-sensitive adhesive composition is very little (e.g. 0.005 parts by weight), the pressure-sensitive adhesive composition according to the present invention can exhibit excellent adhesive strength and stress-relieving property. Furthermore, even if the amount of the silane tobe added is 1,000 times (e.g. 5 parts byweight) of the amount mentioned above, it did not give any adverse effect to the weather resistant property and durability of the pressure-sensitive adhesive, and lowering of the adhesive strength was not seen.

In contrast with the Examples discussed above, in the pressure-sensitive adhesive compositions of the Comparative Examples 1 and 2 to which no silane compound was added and the pressure-sensitive adhesive compositions of the Comparative Examples 3 and 4 to which a silane compound having only one alkoxysilyl group in its molecular, problems of lifting and peeling off of the light-polarizing sheets could not be solved. Further, in these pressure-sensitive adhesive compositions of the Comparative Examples, it was confirmed that increased amount of addition of the silane compound results in lowering the adhesive strength. In particular, in the Comparative Example 4, it was observed that the adhesive strength is extremely lowered.

As described in the above, according to the pressure-sensitive adhesive composition of the present invention, even if a liquid crystal cell to which the light-polarizing sheet is stuck is put under the wet and dry atmosphere, it is possible to relieve the stress concentration caused by contraction of the light-polarizing sheet by the provision of the pressure-sensitive adhesive layer positioned between the light-polarizing sheet and the liquid crystal cell, thereby enabling to prevent white appearance and the like from being produced in optical components such as a liquid crystal cell and the like. Further, it is also possible to prevent the lifting and peeling off of the light polarizing sheet.

In particular, since in the present invention a specific silane compound is used, the above described effects can be obtained with a small amount of addition of the silane compound. Further, there are no adverse effects such as lowering in the adhesive property and the durability of the pressure-sensitive adhesive.

Finally, it is to be noted that the present invention is not limited to the embodiments and the actual Examples mentioned above, and any changes and modifications can be made to the pressure-sensitive adhesive composition of the present invention without departing from the scope and sprit of the invention as defined in the appended claims.

TABLE 1

|  | 100° C. dry for 500 hours | 80° C. × 90% RH for 500 hours |
| --- | --- | --- |
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | ○ | ○ |
| Example 8 | ○ | ○ |
| Example 9 | ○ | ○ |
| Example 10 | ○ | ○ |
| Example 11 | ○ | ○ |
| Example 12 | ○ | ○ |
| Example 13 | ○ | ○ |
| Example 14 | ○ | ○ |
| Example 15 | ○ | ○ |
| Example 16 | ○ | ○ |
| Example 17 | ○ | ○ |
| Comp. Ex. 1 | x | x |
| Comp. Ex. 2 | x | x |
| Comp. Ex. 3 | x | x |
| Comp. Ex. 4 | x | x |
| Comp. Ex. 5 | x | x |

TABLE 2

|  | 100° C. dry for 500 hours | 80° C. × 90% RH for 500 hours | Adhesive Strength (g/25 mm) |
| --- | --- | --- | --- |
| Example 1 | ○ | ○ | 550 |
| Example 2 | ○ | ○ | 500 |
| Example 3 | ○ | ○ | 600 |
| Example 4 | ○ | ○ | 550 |
| Example 5 | ○ | ○ | 650 |
| Example 6 | ○ | ○ | 600 |
| Example 7 | ○ | ○ | 650 |
| Example 8 | ○ | ○ | 550 |
| Example 9 | ○ | ○ | 500 |
| Example 10 | ○ | ○ | 550 |
| Example 11 | ○ | ○ | 500 |
| Example 12 | ○ | ○ | 600 |
| Example 13 | ○ | ○ | 550 |
| Example 14 | ○ | ○ | 500 |
| Example 15 | ○ | ○ | 600 |
| Example 16 | ○ | ○ | 550 |
| Example 17 | ○ | ○ | 600 |
| Comp. Ex. 1 | x | xx | 700 |
| Comp. Ex. 2 | x | xx | 850 |
| Comp. Ex. 3 | x | x | 450 |
| Comp. Ex. 4 | xx | xx | 50 |
| Comp. Ex. 5 | x | x | 550 |

What is claimed is:

1. A pressure-sensitive adhesive composition which comprises, as pressure-sensitive adhesive components thereof:

an acrylic-based polymer having a weight-average molecular weight within the range from 600,000 to 2,000,000; and a silane compound having at least two alkoxysilyl groups.

2. The pressure-sensitive adhesive composition as claimed in claim 1, wherein the silane compound is a compound which is represented by the following general formula (I):

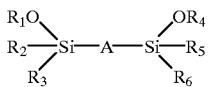 (I)

wherein A is a group having a chain structure and/or a ring structure containing 1 to 12 carbon atom(s), $R_1$ and $R_4$ are respectively an alkyl group containing 1 to 5 carbon atom(s), and $R_2$, $R_3$, $R_5$ and $R_6$ are respectively an alkyl group or alkoxyl group containing 1 to 5 carbon atom(s).

3. The pressure-sensitive adhesive composition as claimed in claim 2, wherein the silane compound is a compound which is represented by the following general formula (II):

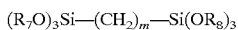 (II)

wherein m is an integer of any one of 1 to 12, and $R_7$ and $R_8$ are respectively an alkyl group containing 1 to 5 carbon atom(s).

4. The pressure-sensitive adhesive composition as claimed in claim 2, wherein the silane compound is a compound which is represented by the following general formula (III):

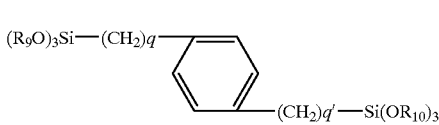 (III)

wherein q and q' are respectively an integer of any one of 0 to 6 and satisfy the relationship of q+q'≦6, and $R_9$ and $R_{10}$ are respectively an alkyl group containing 1 to 5 carbon atom(s), respectively.

5. The pressure-sensitive adhesive composition as claimed in claim 1, wherein the silane compound is a compound which is represented by the following general formula (IV):

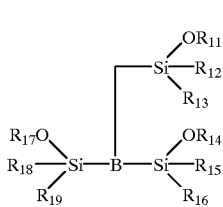 (IV)

wherein B is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s).

6. The pressure-sensitive adhesive composition as claimed in claim 5, wherein the silane compound is a compound which is represented by the following general formula (V):

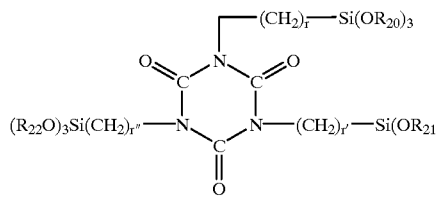 (V)

wherein r, r' and r" are respectively an integer of any one of 0 to 6 and satisfy the relationship of r+r'+r"≦9, and $R_{20}$, $R_{21}$ and $R_{22}$ are respectively an alkyl group containing 1 to 5 carbon atom(s).

7. The pressure-sensitive adhesive composition as claimed in claim 1 wherein a ratio of the silane compound is 0.001 to 10 parts by weight with respect to the pressure-sensitive adhesive composition of 100 parts by weight.

8. The pressure-sensitive adhesive composition as claimed in claim 2 wherein a ratio of the silane compound is 0.001 to 10 parts by weight with respect to the pressure-sensitive adhesive composition of 100 parts by weight.

9. The pressure-sensitive adhesive composition as claimed in claim 3 wherein a ratio of the silane compound is 0.001 to 10 parts by weight with respect to the pressure-sensitive adhesive composition of 100 parts by weight.

10. The pressure-sensitive adhesive composition as claimed in claim 4 wherein a ratio of the silane compound is 0.001 to 10 parts by weight with respect to the pressure-sensitive adhesive composition of 100 parts by weight.

11. The pressure-sensitive adhesive composition as claimed in claim 5 wherein a ratio of the silane compound is 0.001 to 10 parts by weight with respect to the pressure-sensitive adhesive composition of 100 parts by weight.

12. The pressure-sensitive adhesive composition as claimed in claim 6 wherein a ratio of the silane compound is 0.001 to 10 parts by weight with respect to the pressure-sensitive adhesive composition of 100 parts by weight.

13. A pressure-sensitive adhesive sheet having a pressure-sensitive adhesive layer formed of a pressure-sensitive adhesive composition, the pressure-sensitive adhesive composition comprising, as pressure-sensitive adhesive components thereof:

an acrylic-based polymer having a weight-average molecular weight in the range from 600,000 to 2,000,000; and a silane compound having at least two alkoxysilyl groups.

14. The pressure-sensitive adhesive sheet as claimed in claim 13, wherein the silane compound is a compound which is represented by the following general formula (I)

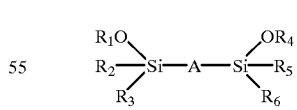 (I)

wherein A is a group having a chain structure and/or a ring structure containing 1 to 12 carbon atom(s), $R_1$ and $R_4$ are respectively an alkyl group containing 1 to 5 carbon atom(s), and $R_2$, $R_3$, $R_5$ and $R_6$ are respectively an alkyl group or alkoxyl group containing 1 to 5 carbon atom(s).

15. The pressure-sensitive adhesive sheet as claimed in claim 14, wherein the silane compound is a compound which is represented by the following general formula (II):

 (II)

wherein m is an integer of any one of 1 to 12, and $R_7$ and R8 are respectively an alkyl group containing 1 to 5 carbon atom(s).

16. The pressure-sensitive adhesive sheet as claimed in claim 14, wherein the silane compound is a compound which is represented by the following general formula (III):
(III)

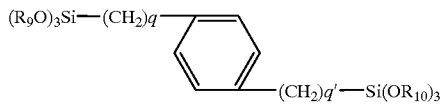

wherein q and q' are respectively an integer of any one of 0 to 6 and satisfy the relationship of q+q'≦6, and $R_9$ and $R_{10}$ are respectively an alkyl group containing 1 to 5 carbon atom(s), respectively.

17. The pressure-sensitive adhesive sheet as claimed in claim 13, wherein the silane compound is a compound which is represented by the following general formula (IV):

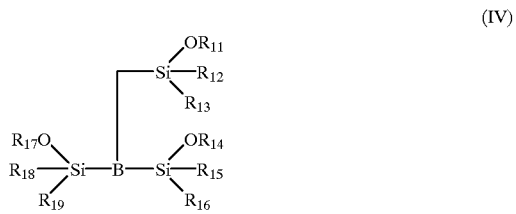

wherein B is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s).

18. The pressure-sensitive adhesive sheet as claimed in claim 17, wherein the silane compound is a compound which is represented by the following general formula (V):

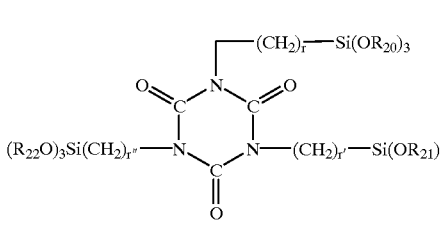

wherein r, r' and r" are respectively an integer of any one of 0 to 6 and satisfy the relationship of r+r'+r"≦9, and $R_{20}$, $R_{21}$ and $R_{22}$ are respectively an alkyl group containing 1 to 5 carbon atom(s).

19. The pressure-sensitive adhesive sheet as claimed in claim 13 wherein a ratio of the silane compound is 0.001 to 10 parts by weight with respect to the pressure-sensitive adhesive composition of 100 parts by weight.

20. The pressure-sensitive adhesive sheet as claimed in claim 14 wherein a ratio of the silane compound is 0.001 to 10 parts by weight with respect to the pressure-sensitive adhesive composition of 100 parts by weight.

21. The pressure-sensitive adhesive sheet as claimed in claim 15 wherein a ratio of the silane compound is 0.001 to 10 parts by weight with respect to the pressure-sensitive adhesive composition of 100 parts by weight.

22. The pressure-sensitive adhesive sheet as claimed in claim 16 wherein a ratio of the silane compound is 0.001 to 10 parts by weight with respect to the pressure-sensitive adhesive composition of 100 parts by weight.

23. The pressure-sensitive adhesive sheet as claimed in claim 17 wherein a ratio of the silane compound is 0.001 to 10 parts by weight with respect to the pressure-sensitive adhesive composition of 100 parts by weight.

24. The pressure-sensitive adhesive sheet as claimed in claim 18 wherein a ratio of the silane compound is 0.001 to 10 parts by weight with respect to the pressure-sensitive adhesive composition of 100 parts by weight.

25. A pressure-sensitive adhesive composition which comprises, as pressure-sensitive adhesive components thereof:

an acrylic-based polymer; and a silane compound represented by the following general formula (III):

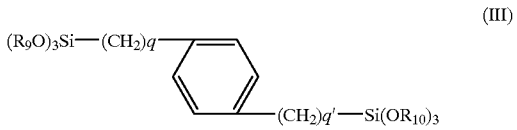

wherein q and q' are respectively an integer of any one of 0 to 6 and satisfy the relationship of q+q'≦6, and $R_9$ and $R_{10}$ are respectively an alkyl group containing 1 to 5 carbon atom(s), respectively.

26. A pressure-sensitive adhesive composition which comprises, as pressure-sensitive adhesive components thereof:

an acrylic-based polymer; and a silane compound represented by the following general formula (IV):

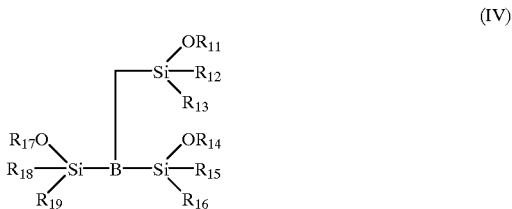

wherein B is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s).

27. A pressure-sensitive adhesive composition which comprises, as pressure-sensitive adhesive components thereof:

an acrylic-based polymer; and a silane compound represented by the following general formula (V):

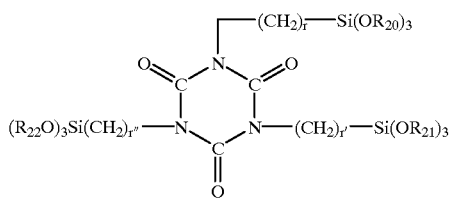

wherein r, r' and r" are respectively an integer of any one of 0 to 6 and satisfy the relationship of r+r'+r"≦9, and $R_{20}$, $R_{21}$ and $R_{22}$ are respectively an alkyl group containing 1 to 5 carbon atom(s).

28. The pressure-sensitive adhesive composition as claimed in claim 25 wherein a ratio of the silane compound is 0.001 to 10 parts by weight with respect to the pressure-sensitive adhesive composition of 100 parts by weight.

29. The pressure-sensitive adhesive composition as claimed in claim 26 wherein a ratio of the silane compound is 0.001 to 10 parts by weight with respect to the pressure-sensitive adhesive composition of 100 parts by weight.

30. The pressure-sensitive adhesive composition as claimed in claim 27 wherein a ratio of the silane compound is 0.001 to 10 parts by weight with respect to the pressure-sensitive adhesive composition of 100 parts by weight.

31. A pressure-sensitive adhesive sheet having a pressure-sensitive adhesive layer formed of a pressure-sensitive adhesive composition, the pressure-sensitive adhesive composition comprising, as pressure-sensitive adhesive components thereof:
an acrylic-based polymer; and
a silane compound represented by the following general formula (III):

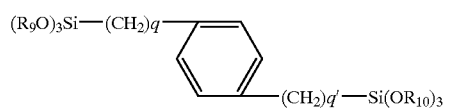

wherein q and q' are respectively an integer of any one of 0 to 6 and satisfy the relationship of q+q'≦6, and $R_9$ and $R_{10}$ are respectively an alkyl group containing 1 to 5 carbon atom(s), respectively.

32. A pressure-sensitive adhesive sheet having a pressure-sensitive adhesive layer formed of a pressure-sensitive adhesive composition, the pressure-sensitive adhesive composition comprising, as pressure-sensitive adhesive components thereof,:
an acrylic-based polymer; and
a silane compound is represented by the following general formula (IV):

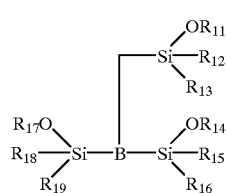

wherein B is a group having a chain structure and/or a ring structure containing 1 to 12 carbon atom(s), $R_{11}$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s).

33. A pressure-sensitive adhesive sheet having a pressure-sensitive adhesive layer formed of a pressure-sensitive adhesive composition, the pressure-sensitive adhesive composition comprising, as pressure-sensitive adhesive components thereof,:
an acrylic-based polymer; and
a silane compound is represented by the following general formula (V):

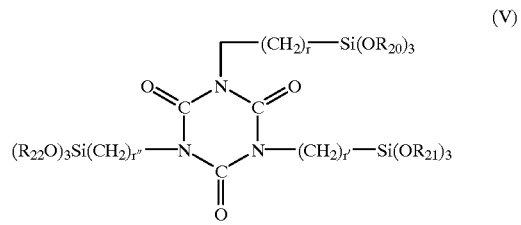

wherein r, r' and r" are respectively an integer of any one of 0 to 6 and satisfy the relationship of r+r'+r"≦9, and $R_{20}$, $R_{21}$ and $R_{22}$ are respectively an alkyl group containing 1 to 5 carbon atom(s).

34. The pressure-sensitive adhesive sheet as claimed in claim 31 wherein a ratio of the silane compound is 0.001 to 10 parts by weight with respect to the pressure-sensitive adhesive composition of 100 parts by weight.

35. The pressure-sensitive adhesive sheet as claimed in claim 32 wherein a ratio of the silane compound is 0.001 to 10 parts by weight with respect to the pressure-sensitive adhesive composition of 100 parts by weight.

36. The pressure-sensitive adhesive sheet as claimed in claim 33 wherein a ratio of the silane compound to be added is 0.001 to 10 parts by weight with respect to the pressure-sensitive adhesive composition of 100 parts by weight.

37. A pressure sensitive adhesive sheet comprising:
an optical function film having two sides; and,
a pressure-sensitive adhesive layer provided on a one side of the optical film, the pressure-sensitive adhesive layer being formed of a pressure-sensitive adhesive composition that comprises, as pressure-sensitive components thereof, an acrylic-based polymer having a weight-average molecular weight that is in the range from 600,000 to 2,000,000 and a silane compound having at least two alkoxysilyl groups.

38. The pressure-sensitive adhesive composition as claimed in claim 37, wherein the silane compound is a compound which is represented by the following general formula (I):

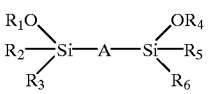

wherein A is a group having a chain structure and/or a ring structure containing 1 to 12 carbon atom(s), $R_1$ and $R_4$ are respectively an alkyl group containing 1 to 5 carbon atom(s), and $R_2$, $R_3$, $R_5$ and $R_6$ are respectively an alkyl group or alkoxyl group containing 1 to 5 carbon atom(s).

39. The pressure-sensitive adhesive composition as claimed in claim 38, wherein the silane compound is a compound which is represented by the following general formula (II):

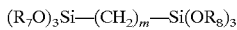

wherein m is an integer of any one of 1 to 12, and $R_7$ and $R_8$ are respectively an alkyl group containing 1 to 5 carbon atom(s).

40. The pressure-sensitive adhesive composition as claimed in claim 38, wherein the silane compound is a compound which is represented by the following general formula (III):

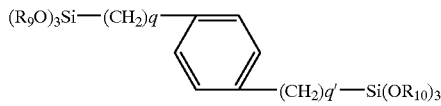

(III)

wherein q and q' are respectively an integer of any one of 0 to 6 and satisfy the relationship of q+q'≦6, and $R_9$ and $R_{10}$ are respectively an alkyl group containing 1 to 5 carbon atom(s), respectively.

41. The pressure-sensitive adhesive composition as claimed in claim 37, wherein the silane compound is a compound which is represented by the following general formula (IV):

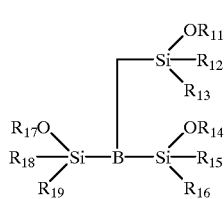

(IV)

wherein B is a group having a chain structure and/or a ring structure containing 1 to 12 carbon atom(s), $R_1$, $R_{14}$ and $R_{17}$ are respectively an alkyl group containing 1 to 5 carbon atom(s), and $R_{12}$, $R_{13}$, $R_{15}$, $R_{16}$, $R_{18}$ and $R_{19}$ are respectively an alkyl group or an alkoxyl group containing 1 to 5 carbon atom(s).

42. The pressure-sensitive adhesive composition as claimed in claim 41, wherein the silane compound is a compound which is represented by the following general formula (V):

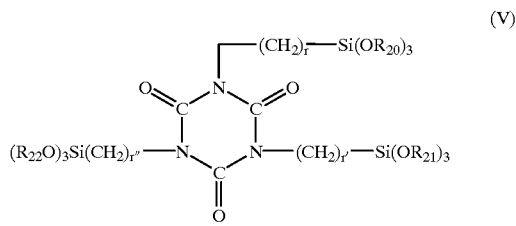

(V)

wherein r, r' and r'' are respectively an integer of any one of 0 to 6 and satisfy the relationship of r+r''+r''≦9, and $R_{20}$, $R_{21}$ and $R_{22}$ are respectively an alkyl group containing 1 to 5 carbon atom(s).

43. The pressure-sensitive adhesive composition as claimed in claim 37 wherein a ratio of the silane compound is 0.001 to 10 parts by weight with respect to the pressure-sensitive adhesive composition of 100 parts by weight.

44. The pressure-sensitive adhesive composition as claimed in claim 38 wherein a ratio of the silane compound is 0.001 to 10 parts by weight with respect to the pressure-sensitive adhesive composition of 100 parts by weight.

45. The pressure-sensitive adhesive composition as claimed in claim 39 wherein a ratio of the silane compound is 0.001 to 10 parts by weight with respect to the pressure-sensitive adhesive composition of 100 parts by weight.

46. The pressure-sensitive adhesive composition as claimed in claim 40 wherein a ratio of the silane compound is 0.001 to 10 parts by weight with respect to the pressure-sensitive adhesive composition of 100 parts by weight.

47. The pressure-sensitive adhesive composition as claimed in claim 41 wherein a ratio of the silane compound is 0.001 to 10 parts by weight with respect to the pressure-sensitive adhesive composition of 100 parts by weight.

48. The pressure-sensitive adhesive composition as claimed in claim 42 wherein a ratio of the silane compound is 0.001 to 10 parts by weight with respect to the pressure-sensitive adhesive composition of 100 parts by weight.

* * * * *